(12) United States Patent
Balfour

(10) Patent No.: US 11,776,420 B2
(45) Date of Patent: Oct. 3, 2023

(54) AUGMENTED REALITY IN WIRE HARNESS INSTALLATION

(71) Applicant: B/E Aerospace, Inc., Winston-Salem, NC (US)

(72) Inventor: David Balfour, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 142 days.

(21) Appl. No.: 17/174,822

(22) Filed: Feb. 12, 2021

(65) Prior Publication Data

US 2022/0262271 A1    Aug. 18, 2022

(51) Int. Cl.
  G09B 19/00    (2006.01)
  G06V 20/20    (2022.01)
  G06T 19/00    (2011.01)

(52) U.S. Cl.
  CPC .......... G09B 19/003 (2013.01); G06T 19/006 (2013.01); G06V 20/20 (2022.01)

(58) Field of Classification Search
  CPC ..... G09B 19/003; G06T 19/006; G06V 20/20
  See application file for complete search history.

(56) References Cited

U.S. PATENT DOCUMENTS

| 10,657,721 | B2 | 5/2020 | Yin et al. |
| 10,846,899 | B2* | 11/2020 | Pokorny .............. G06F 3/0304 |
| 11,029,671 | B1* | 6/2021 | Guglielmo .............. G06F 3/14 |
| 11,132,479 | B1* | 9/2021 | Tyson, II ......... G05B 19/41805 |
| 11,164,396 | B2* | 11/2021 | Deck ..................... G06T 17/00 |
| 11,422,380 | B2* | 8/2022 | Goodrich .......... G02B 27/0149 |
| 2004/0131232 | A1 | 7/2004 | Meisner et al. |
| 2013/0278635 | A1* | 10/2013 | Maggiore ............. G06F 3/0304 |
| | | | 345/633 |
| 2016/0182877 | A1* | 6/2016 | Deluca ................. H04N 13/368 |
| | | | 348/54 |
| 2016/0292925 | A1* | 10/2016 | Montgomerie ......... H04L 65/75 |
| 2016/0335800 | A1* | 11/2016 | DeStories ............... G06F 3/017 |
| 2016/0364913 | A1* | 12/2016 | Montaigne ........... G06T 19/006 |

(Continued)

FOREIGN PATENT DOCUMENTS

| EP | 3104241 A1 * | 12/2016 | .............. G01C 3/08 |
| EP | 3483703 A1 | 5/2019 | |

(Continued)

OTHER PUBLICATIONS

Westerfield et al., Intelligent Augmented Reality Training for Assembly Tasks, Springer, LNAI 7926, pp. 542-551 (Year: 2013).*

(Continued)

*Primary Examiner* — Motilewa Good-Johnson
(74) *Attorney, Agent, or Firm* — Suiter Swantz pc llo

(57) ABSTRACT

An AR system to assist with installation of wire harnesses identifies landmarks in the installation environment and continuously orients 3D models of the wire harness components with reference to the landmarks in 3D space. The 3D models are rendered in an AR device to correspond to the placement in 3D space with respect to the landmarks. The installation process is broken down into steps and sub-steps. An installer may install the wire harness according to predefined steps and be presented with higher granularity instructions upon request. The higher granularity sub-steps may include additional 3D models.

14 Claims, 4 Drawing Sheets

(56) References Cited

U.S. PATENT DOCUMENTS

| | | | |
|---|---|---|---|
| 2018/0336732 A1* | 11/2018 | Schuster | G06Q 10/0875 |
| 2019/0103037 A1 | 4/2019 | Lussier | |
| 2019/0114482 A1 | 4/2019 | Li et al. | |
| 2019/0251747 A1 | 8/2019 | Yin et al. | |
| 2019/0266804 A1* | 8/2019 | Kohlhoff | G06T 13/20 |
| 2020/0211292 A1* | 7/2020 | Wu | G06F 30/12 |
| 2020/0250890 A1* | 8/2020 | Zhou | G06T 7/55 |
| 2020/0334613 A1* | 10/2020 | Palazzo | G06F 3/013 |
| 2021/0012396 A1* | 1/2021 | Kim | G06Q 30/0283 |
| 2021/0034870 A1* | 2/2021 | Ha | G06T 13/20 |
| 2021/0049822 A1* | 2/2021 | Meriaz | G06F 3/0482 |
| 2021/0358201 A1* | 11/2021 | Cady | G06F 30/13 |
| 2021/0384716 A1* | 12/2021 | Rhysing | G06T 19/006 |
| 2022/0262076 A1* | 8/2022 | Grondin | G09B 5/065 |

FOREIGN PATENT DOCUMENTS

| | | | |
|---|---|---|---|
| WO | 2019156682 A1 | 8/2019 | |
| WO | 2020077323 A1 | 4/2020 | |
| WO | 2020113329 A1 | 6/2020 | |

OTHER PUBLICATIONS

Extended Search Report in European Application No. 22151180.1 dated Jun. 21, 2022, 9 pages.
Molineros, J., 2022. Computer Vision and Augmented Reality for Guiding Assembly https://etda.libraries.psu.edu/catalog/5942, date unknown.

* cited by examiner

AUGMENTED REALITY IN WIRE HARNESS INSTALLATION

BACKGROUND

Wire harness installation requires frequent, periodic reference to drawings or screens to visualize the installation. Often, the reference drawings are generalized to a single installation environment even though such environments are often divergent, for example various aircraft seat frames are different and not generalizable for wire frame installation. Furthermore, reference drawings cannot adequately represent the nuance of placement in 3D space. Even existing augmented reality (AR) mechanisms to assist with wire harness installation only place the reference documents within the scene of the installation.

SUMMARY

In one aspect, embodiments of the inventive concepts disclosed herein are directed to an AR system to assist with installation of wire harnesses. The AR system identifies landmarks in the installation environment and continuously orients 3D models of the wire harness components with reference to the landmarks in 3D space. The 3D models are rendered in an AR device to correspond to the placement in 3D space with respect to the landmarks.

In a further aspect, the installation process is broken down into steps and sub-steps. An installer may install the wire harness according to predefined steps and be presented with higher granularity instructions upon request. The higher granularity sub-steps may include additional 3D models.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
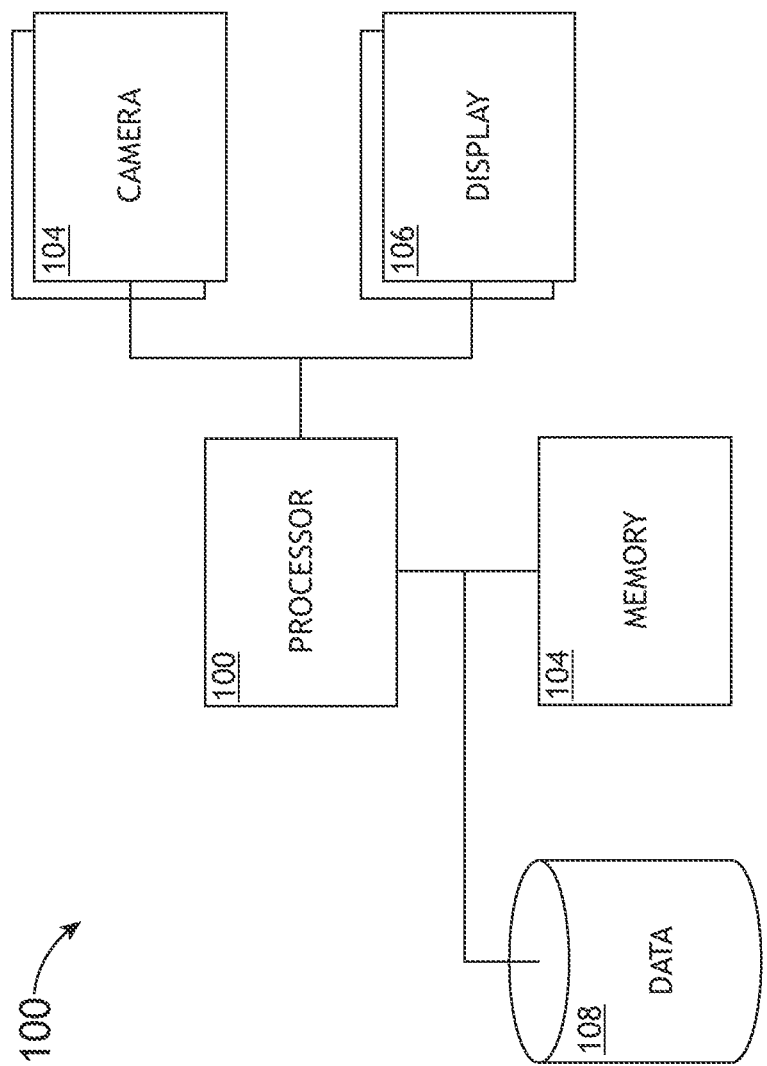
FIG. 1 shows a block diagram of an AR system according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an AR system to assist with installation of wire harnesses. The AR system identifies landmarks in the installation environment and continuously orients 3D models of the wire harness components with reference to the landmarks in 3D space. The 3D models are rendered in an AR device to correspond to the placement in 3D space with respect to the landmarks.

Referring to FIG. 1, a block diagram of an AR system according to an exemplary embodiment is shown. The AR system includes a processor 100, memory 102 connected to the processor 100, one or more cameras 104 connected to the processor 100, and one or more displays 106 connected to the processor 100. The memory 102 stores non-transitory processor executable code for configuring the processor 100 to receive image streams from the one or more cameras 104, process the images, and render overlay images on the one or more displays 106.

During an exemplary installation processes, an installer using an AR device including the AR system may select an installation environment (a specific model of aircraft seat or aircraft seat frame) or the processor 100 may determine the installation environment automatically via object recognition from the image streams and reference to a known database of installation environments stored in a data storage element 108 in data communication with the processor 100; for example, each aircraft seat frame may include features that identifiable via edge detection algorithms. The processor 100 retrieves a 3D model of the installation environment including a plurality of identifiable landmarks of the installation environment. The processor 100 identifies corresponding landmarks in the image streams and orients the 3D models based on those landmarks. 3D models may be directly derived from engineering models such as Jupiter Tessellation (JT) files.

The processor 100 then retrieves stored 3D models corresponding to a sequence of installation steps of a wire harness in the installation environment. In at least one embodiment, the processor 100 defines a 3D space based on the location and orientation of the 3D model of the installation environment and continuously updates the installer's location and orientation in that 3D space based on changing landmark locations in the image streams.

The processor orients a first installation step 3D model in the 3D space with respect to a known relation between the first installation step 3D model and the 3D model of the installation environment, and renders the first installation step 3D model as an overlay to the image streams on the one or more displays 106. In at least one embodiment, such rendering may be stereoscopic to create a holographic type view of the first installation step 3D model in the installers actual view.

In at least one embodiment, the processor 100 may determine that the first installation step is complete based on an object recognition algorithm operating on the image streams that determines an actual wire harness component occupies a space corresponding to the first installation step 3D model. Alternatively, the processor 100 may wait for confirmation from the installer that the first installation step is complete. Then the processor 100 de-renders the first installation step 3D model and iteratively performs the same process with subsequent installation step 3D models until the installation process is complete.

In at least one embodiment, the installation step 3D models may correspond to major installation step. Interstitial installation step 3D models may also be stored, corresponding to minor installation steps of higher instructional granularity. For example, major installation steps may correspond to wire harness placement points while interstitial installation steps may show actual fixation steps.

Figure 2:
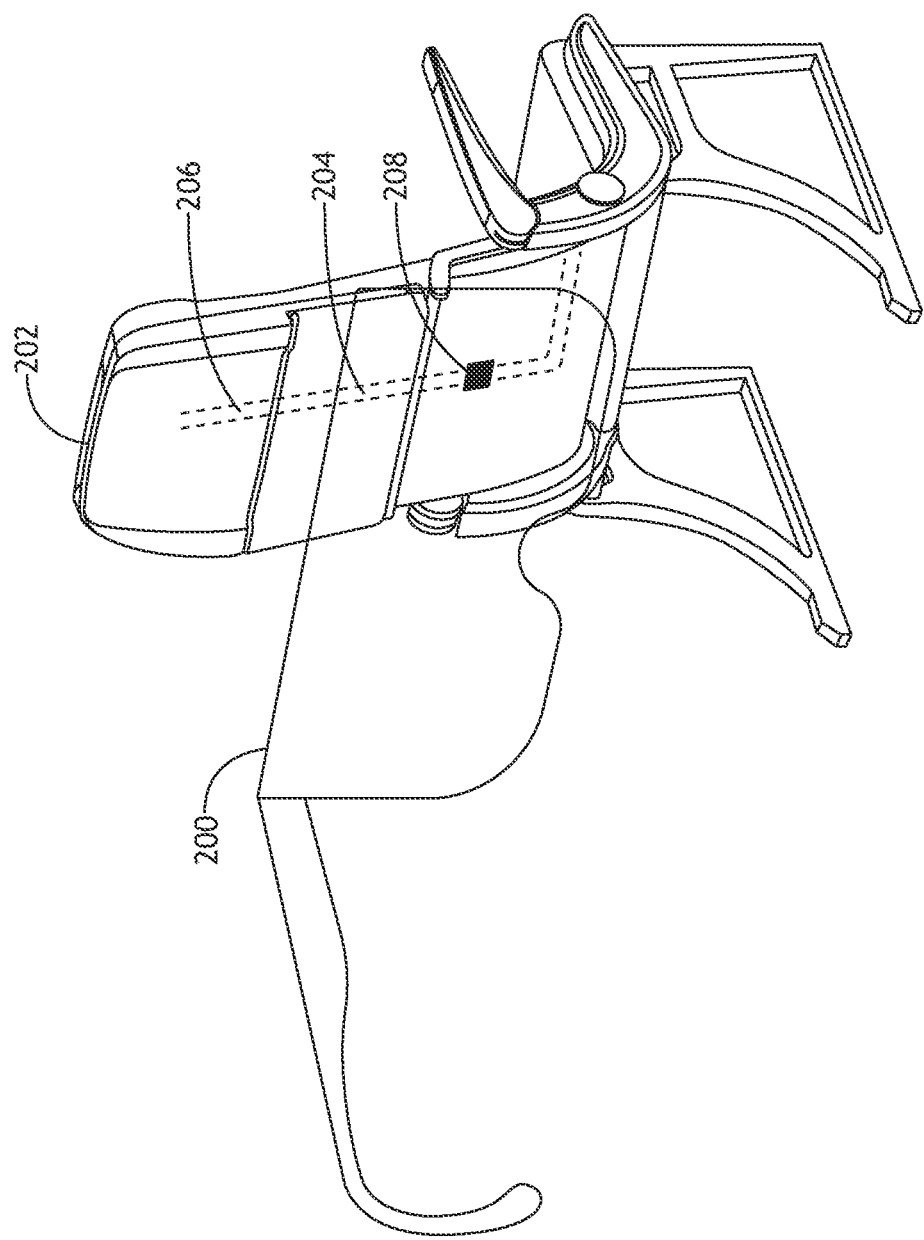
FIG. 2 shows an environmental view of an AR system according to an exemplary embodiment.

Referring to FIG. 2, an environmental view of an AR system according to an exemplary embodiment is shown. The AR system utilizes an AR device 200 having one or more incorporated cameras and one or more displays disposed in the field of view of an installer. The displays may be at least partially translucent or transparent, or may comprise projection elements disposed to project an image on a surface of the AR device 200 within the installers field of view. The AR system renders 3D models 204 of various wire harness installation steps over an actual view of the wire harness installation environment (for example, an aircraft seat frame 202).

The AR system locates the 3D models 204 in 3D space based on landmarks identified on the aircraft seat frame 202 in image streams from the incorporated cameras. A 3D model of the aircraft seat frame 202 defines proper locations 206 of the installed wire harness, allowing the 3D models 204 to be positioned and oriented with respect to the aircraft seat frame 3D model; the 3D models 204 are continuously re-rendered to accommodate the changes in position and orientation of the installer.

The AR system may render detailed 3D model elements 208 detailing installation steps. For example, an animation showing a fixation process for securing the wire harness to the aircraft seat frame 202 may be rendered.

In at least one embodiment, the AR system may distinguish among a plurality of possible aircraft seat frames 202 based on certain identifiable characteristics/landmarks on each aircraft seat frame 202. Each aircraft seat frame 202 may require specific installation steps; upon identifying the aircraft seat frame 202 being used, the AR system my may utilize a specific set of 3D models 204 corresponding to installation steps for the specific aircraft seat frame 202.

Figure 3:
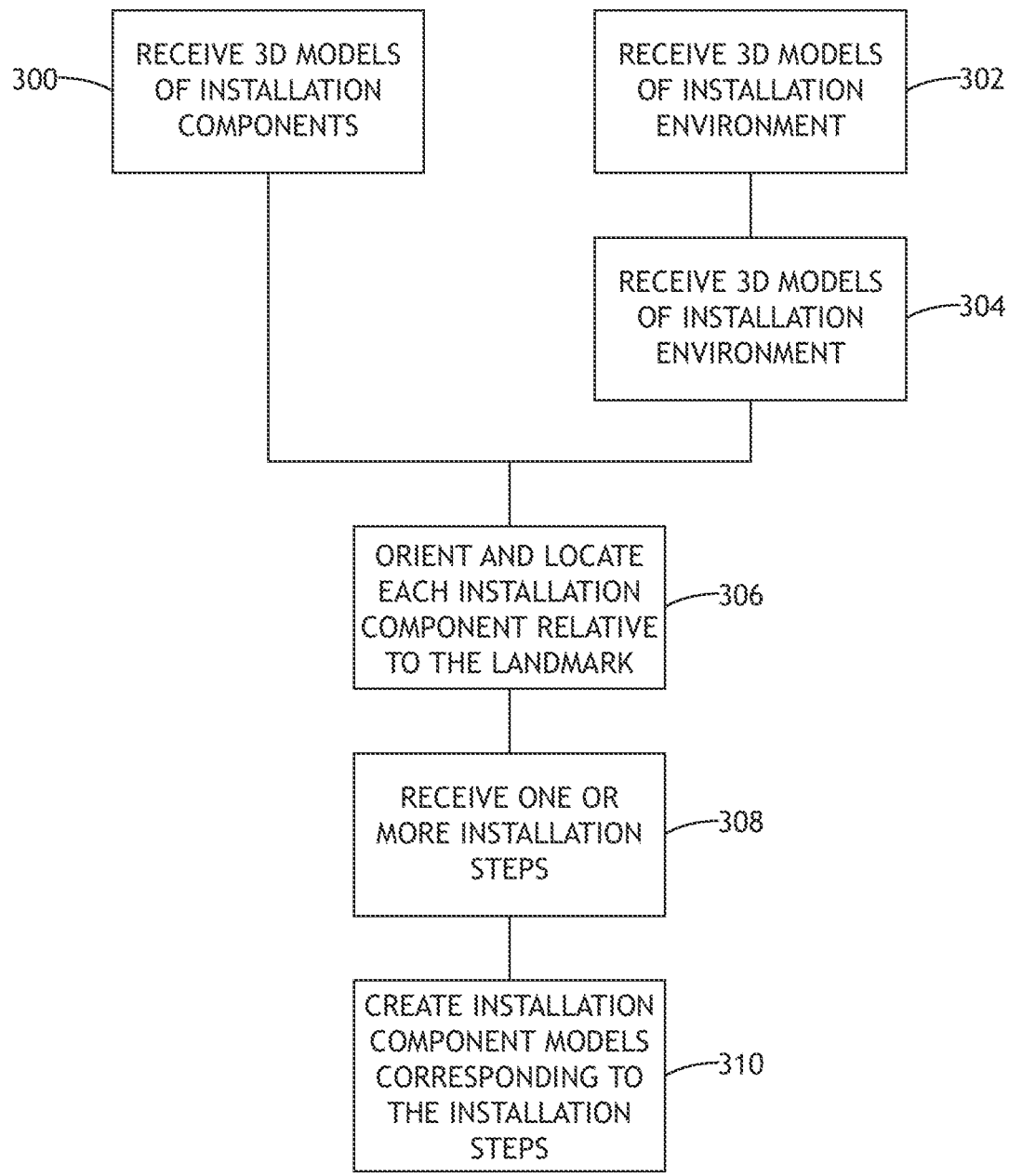
FIG. 3 shows a flowchart for a method for creating 3D model installation steps for an AR system according to an exemplary embodiment.

Referring to FIG. 3, a flowchart for a method for creating 3D model installation steps for an AR system according to an exemplary embodiment is shown. A processor receives 300 3D models of installation components, and receives 302 3D models of one or more installation environments corresponding to real world structures where an installer will actually install the installation components.

Based on the 3D models of the installation environments, landmarks are identified 304 that may be used to orient the 3D model of each installation environment with respect to a real-world analog via object recognition algorithms. The 3D models of installation components are each located and oriented 306 with respect to the identified landmarks.

The processor receives 308 one or more installation steps, each corresponding to at least one of the 3D models of installation components as installed in a 3D models of one of the installation environments. In at least one embodiment, the one or more installation steps may be hierarchical such that each requires a previous step to be completed. In at least one embodiment, installation steps may be nested such that one or more of the installation steps may include higher granularity sub-steps. In at least one embodiment, each installation step may be associated with a 3D animation of the installation step utilizing the corresponding 3D models of installation components with respect to the landmarks.

Based on the installation steps, installation component models are created 310. Each installation component model corresponds to an installation step, the corresponding 3D models of installation components, any associated 3D animations, landmarks, and installation step completion criteria that may be identified object recognition algorithms such as identifying when a real-world installation component is substantially in the same position and orientation as the 3D model of the installation component.

Figure 4:
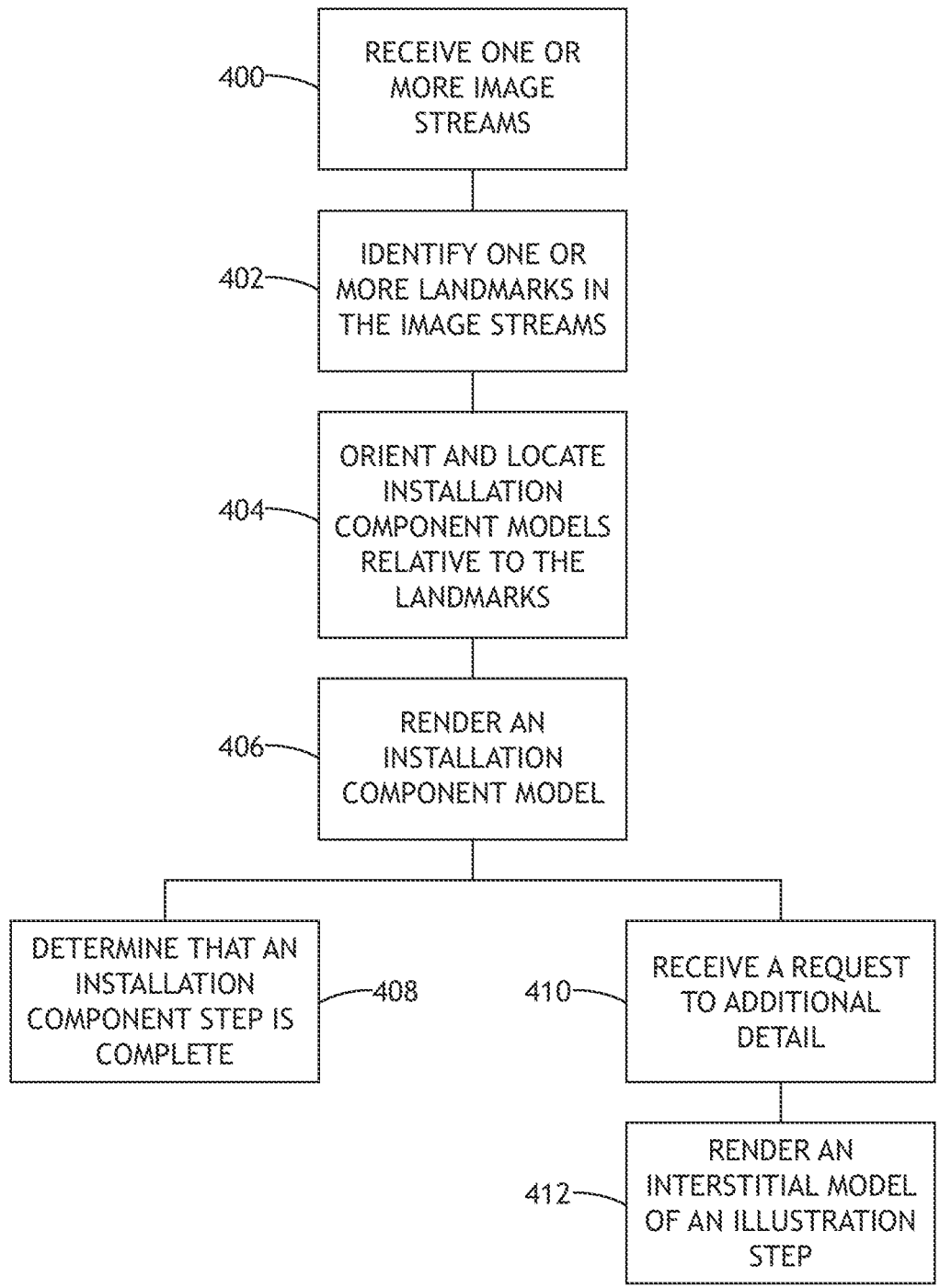
FIG. 4 shows a flowchart for a method for installing wire harnesses with an AR system according to an exemplary embodiment.

Referring to FIG. 4, a flowchart for a method for installing wire harnesses with an AR system according to an exemplary embodiment is shown. The AR system receives 400 one or more image streams during an installation process. An AR system processor identifies 402 one or more landmarks in each image stream corresponding to fixed points in an installation environment (such as an aircraft seat frame).

The processor orients and locates 404 one or more installation component models relative to the landmarks; each installation component model corresponding to an installation step. The installation component model is then rendered 406 in an AR system display, potentially a stereoscopic display.

The processor may determine 408 that an installation step is complete based on certain criteria associated with the installation component model, then render 406 a subsequent installation step. Alternatively, or in addition, the processor may receive 410 a request for additional detail and render 412 an interstitial model of an installation step with increased granularity or installation detail.

Embodiments of the present disclosure may be utilized for electrical wire harness placement during an aircraft seat assembly process. The AR system displays a digital, holographic overlay of the wire harness in a set sequence onto the seat frame to indicate placement of the physical wires. This can be used for placement of wires and also for quality check/verification during assembly. The holographic overlay for each wire harness has its position defined for each component ensuring correct placement of wires, electrical boxes, and cable ties. In at least one embodiment, components and the seat frame may be recorded at each installation step for quality verification.

Embodiments of the present disclosure may be utilized for applications other than wire harness installation, such as other component installation processes, galley operations, and various crew training procedures.

Artificial intelligence may be utilized in certain applications to identify the installation environment and completion of installation steps.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   at least one processor in data communication with a memory storing processor executable code for configuring the at least one processor to:
   receive one or more image streams;
   identify one or more landmarks in each image stream, the one or more landmarks each corresponding to a fixed point on an aircraft seat frame;
   orient and locate a 3D component model with respect to the landmarks;
   retrieve a sequence of major installation steps and one or more sequences of interstitial installation steps, the major installation steps corresponding to wire harness placement points and each of the sequences of interstitial installation steps corresponding to individual fixation steps for one of the major installation steps;
   render an overlay of the 3D component model to appear at a real-world location of a corresponding installation component during a major installation step in a sequence of major installation steps;
   determine that the major installation step is complete via an object recognition algorithm operating on the one or more image streams to determine that the corresponding installation component occupies a space corresponding to the 3D component model;
   render an overlay of a subsequent 3D component model to appear at a real-world location of a corresponding installation component during a subsequent major installation step in the sequence of major installation steps;
   receive a request from an installer for a detailed installation step;
   render a high-detail 3D component model; and
   render the sequence of interstitial installation steps corresponding to the current major installation step.

2. The computer apparatus of claim 1, wherein the 3D component model comprises an installation animation specific to the major installation step.

3. The computer apparatus of claim 1, wherein the at least one processor is further configured to:
   identify a type of aircraft seat frame based on the landmarks; and
   apply a 3D component model specific to the type of aircraft seat frame.

4. The computer apparatus of claim 1, wherein the at least one processor is further configured to continuously re-render the overlay to continuously correspond to the real-world location when an installer moves.

5. A method comprising:
   receiving one or more image streams from the one or more camera;
   identifying one or more landmarks in each image stream, the one or more landmarks each corresponding to a fixed point on an aircraft seat frame;
   orienting and locating a 3D component model with respect to the landmarks;
   retrieving a sequence of major installation steps and one or more sequences of interstitial installation steps, the major installation steps corresponding to wire harness placement points and each of the sequences of interstitial installation steps corresponding to individual fixation steps for one of the major installation steps;
   rendering an overlay of the 3D component model on the one or more display devices to appear at a real-world location of a corresponding installation component during a major installation step in a sequence of major installation steps;
   determining that the major installation step is complete via an object recognition algorithm operating on the one or more image streams to determine that the corresponding installation component occupies a space corresponding to the 3D component model;
   rendering an overlay of a subsequent 3D component model to appear at a real-world location of a corresponding installation component during a subsequent major installation step in the sequence of major installation steps;
   receiving a request from an installer for a detailed installation step;
   rendering a high-detail 3D component model; and
   rendering the sequence of interstitial installation steps corresponding to the current major installation step.

6. The method of claim 5, wherein the 3D component model comprises an installation animation specific to the major installation step.

7. The method of claim 5, further comprising:
   identifying a type of aircraft seat frame based on the landmarks; and
   applying a 3D component model specific to the type of aircraft seat frame.

8. The method of claim 5, further comprising continuously re-rendering the overlay to continuously correspond to the real-world location when an installer moves.

9. The method of claim 5, wherein rendering the overlay comprises stereoscopic rendering.

10. A system comprising:
one or more cameras;
one or more display devices configured to overlay a rendered image onto a real-world scene; and
at least one processor in data communication with a memory storing processor executable code for configuring the at least one processor to:
  receive one or more image streams from the one or more camera;
  identify one or more landmarks in each image stream, the one or more landmarks each corresponding to a fixed point on an aircraft seat frame;
  orient and locate a 3D component model with respect to the landmarks;
  retrieve a sequence of major installation steps and one or more sequences of interstitial installation steps, the major installation steps corresponding to wire harness placement points and each of the sequences of interstitial installation steps corresponding to individual fixation steps for one of the major installation steps;
  render an overlay of the 3D component model to appear at a real-world location of a corresponding installation component during a major installation step in a sequence of major installation steps;
  determine that the major installation step is complete via an object recognition algorithm operating on the one or more image streams to determine that the corresponding installation component occupies a space corresponding to the 3D component model;
  render an overlay of a subsequent 3D component model to appear at a real-world location of a corresponding installation component during a subsequent major installation step in the sequence of major installation steps;
  receive a request from an installer for a detailed installation step;
  render a high-detail 3D component model; and
  render the sequence of interstitial installation steps corresponding to the current major installation step.

11. The system of claim 10, wherein the 3D component model comprises an installation animation specific to the major installation step.

12. The system of claim 10, wherein the at least one processor is further configured to:
  identify a type of aircraft seat frame based on the landmarks; and
  apply a 3D component model specific to the type of aircraft seat frame.

13. The system of claim 10, wherein the at least one processor is further configured to continuously re-render the overlay to continuously correspond to the real-world location when an installer moves.

14. The system of claim 10, wherein the one or more display devices comprise a stereoscopic display device.

* * * * *